(12) United States Patent
Tanaya

(10) Patent No.: US 8,375,914 B2
(45) Date of Patent: Feb. 19, 2013

(54) COMBUSTION STATE DETECTION DEVICE FOR INTERNAL COMBUSTION ENGINE

(75) Inventor: Kimihiko Tanaya, Chiyoda-ku (JP)

(73) Assignee: Mitsubishi Electric Corporation, Tokyo (JP)

(*) Notice: Subject to any disclaimer, the term of this patent is extended or adjusted under 35 U.S.C. 154(b) by 425 days.

(21) Appl. No.: 12/723,379

(22) Filed: Mar. 12, 2010

(65) Prior Publication Data

US 2011/0088646 A1    Apr. 21, 2011

(30) Foreign Application Priority Data

Oct. 15, 2009    (JP) .................................. 2009-238265

(51) Int. Cl.
*F02N 11/08* (2006.01)
*F02P 5/00* (2006.01)

(52) U.S. Cl. .................. 123/179.3; 123/406.37

(58) Field of Classification Search ............... 123/179.3, 123/179.5, 406.14, 406.37; 73/35.08, 35.07, 73/35.01, 116.02; 701/111
See application file for complete search history.

(56) References Cited

U.S. PATENT DOCUMENTS

| | | | | |
|---|---|---|---|---|
| 5,337,716 A * | 8/1994 | Fukui et al. | ............. | 123/406.14 |
| 6,418,785 B1 * | 7/2002 | Hatazawa et al. | ............. | 73/35.08 |
| 6,848,296 B2 * | 2/2005 | Tanaya | ............. | 73/35.08 |
| 7,174,251 B2 * | 2/2007 | Iwamoto et al. | ............. | 701/111 |
| 7,444,232 B1 * | 10/2008 | Inada et al. | ............. | 701/111 |
| 2002/0033041 A1 * | 3/2002 | Yamada et al. | ............. | 73/35.01 |
| 2004/0244468 A1 * | 12/2004 | Iwamoto et al. | ............. | 73/35.08 |
| 2008/0257018 A1 * | 10/2008 | Inada et al. | ............. | 73/35.08 |
| 2008/0281504 A1 * | 11/2008 | Inada et al. | ............. | 701/111 |

FOREIGN PATENT DOCUMENTS

| | | |
|---|---|---|
| JP | 2001-090647 A | 4/2001 |
| JP | 2002-004996 A | 1/2002 |
| JP | 2008267243 A * | 11/2008 |

* cited by examiner

*Primary Examiner* — Mahmoud Gimie

(74) *Attorney, Agent, or Firm* — Sughrue Mion, PLLC

(57) ABSTRACT

A combustion state detection device for an internal combustion engine includes: an ignition control unit that controls activation of a primary winding for ignition; a comparison value setting unit that sets a comparison value with respect to an ion signal; and a combustion state discrimination unit that determines the occurrence of misfire depending on the magnitude of the ion signal with respect to the comparison value; wherein the ignition control unit, after generating a spark, reactivates the primary winding at least one time during one combustion stroke so that an induction voltage similar to that generated in the secondary winding at around a time when the primary winding begins to be activated for the purpose of starting combustion is generated in the secondary winding.

6 Claims, 6 Drawing Sheets

COMBUSTION STATE DETECTION DEVICE FOR INTERNAL COMBUSTION ENGINE

BACKGROUND OF THE INVENTION

1. Field of the Invention

The present invention relates to a combustion state detection device, for an internal combustion engine, that detects by ion current combustion/misfire in the internal combustion engine.

2. Description of the Related Art

In operating an engine that is mostly used for automotive power, unburned fuel sometimes reaches a three-way catalyst on the occurrence of misfire. The three-way catalyst is disposed in the exhaust path so as to reduce pollutants in engine exhaust; in the event of misfire, efficiency of reducing pollutants in engine exhaust is seriously deteriorated due to deterioration of catalyst efficiency and damage of the catalyst and the like caused by the unburned fuel burning in the catalyst. Therefore, detection of misfire draws attention from the viewpoint of maintaining the environment which has raised concerns in recent years, so that its provision has begun to be mandatory worldwide.

In order to cope with this matter, a misfire detection device using ion current has been put into practical use, in which a bias voltage is applied to the center electrode of a spark plug, so as to pick up as an ion current ions produced associated with combustion, thereby discriminating between combustion and misfire in an internal combustion engine.

FIG. 5 shows an example of conventional misfire detection devices using ion current, which can be roughly split into two blocks, that is, an ignition block 501 and an ion detection block 502. The ignition block 501 includes a primary winding 501a, a secondary winding 501b and a switching element 501c; one end of the primary winding 501a is connected to the positive terminal of a battery, and the other end, to ground via the switching element 501c for interrupting a primary current. Moreover, a spark plug 503 and the ion detection block 502 are connected to the high and low voltage sides of the secondary winding 501b, respectively.

The ion detection block 502 includes a bias circuit 502a that applies a positive bias voltage to the spark plug 503, a bottom-hold circuit 502b that generates a bottom-hold threshold value for the ion current, and a waveform shaping circuit 502c that shapes a waveform by comparing the ion current with the bottom-hold threshold value so as to output a combustion pulse.

The operation of detecting the ion current will be explained next.

When a HIGH ignition signal is applied to the switching element 501c of the ignition block 501, the primary current begins to flow through a path including the primary winding 501a. If the primary current, when reaching a sufficiently high level, is interrupted by switching the ignition signal into the LOW state, a negative high voltage is generated at the end of the secondary winding 501b to which the spark plug 503 is connected. This high voltage in turn causes a spark between the center electrode of the spark plug 503 and ground.

A spark current caused by the spark flows via the secondary winding 501b from the center electrode of the spark plug 503 into the bias circuit 502a of the ion detection block 502, which charges a capacitor in the bias circuit. The capacitor continues to be charged until the voltage across the capacitor reaches the breakdown voltage of a Zener diode connected in parallel therewith, and when the voltage exceeds the breakdown voltage, a secondary current (the spark current) flows to ground through the Zener diode and a diode connected thereto in the forward direction.

When the spark current caused by the spark stops, the voltage generated by charging the capacitor begins to be applied to the center electrode of the spark plug 503 as a bias voltage for detecting ions. Moreover, the spark charges the capacitor to generate the bias voltage as well as ignites combustible air-fuel mixture at the same time. Ignition starts combustion reaction, thereby producing ions. If the bias voltage is applied to the center electrode of the spark plug 503 at this moment, an ion current flows through the secondary winding 501b from the capacitor of the bias circuit 502a toward the center electrode of the spark plug 503, which is then detected.

Following the above, the operation of discriminating between combustion and misfire using the ion current will be explained next.

To put it simply, if the ion current flows, a determination of combustion can be made, whereas no ion current flows, a determination of misfire can be done. However, depending on engine operating conditions, carbon adheres and accumulates in a space between the center and ground electrodes of the spark plug due to incomplete combustion of air-fuel mixture, so that the isolation resistance between the center and ground electrodes sometimes decreases, which in turn causes a leak current to flow along the ion current path as shown in FIG. 6C1 even if no combustion is taking place.

Since flowing of the leak current consumes electric charge that has been stored in the capacitor of the bias circuit 502a, the more the leak current flows, the more the bias voltage, which is the voltage across the capacitor, drops as shown in FIG. 6B. If the isolation resistance is assumed not to vary due to carbon during one combustion stroke, according to Ohm's low, the leak current gradually decreases demonstrating a monotonically-decreasing trend.

Under conditions of this leak current arising, if further combustion takes place and anion current arises, a current flowing along the path demonstrates a shape as shown in FIG. 6C2 in which the ion current is added to the leak current.

In the device shown in Japanese Patent Publication No. 3523542 (hereinafter referred to as Patent Document 1), a bottom-hold threshold value is used as a comparison threshold value for detecting the ion current superimposed on the monotonically-decreasing leak current. The bottom-hold threshold value, as shown by the dotted-dashed lines in FIG. 6, is such that given as an initial value a current value at time 601 that is the starting point for detecting the ion current, the threshold value is compared with a current value along a current waveform; if the current value is smaller, the threshold value is decreased toward the current value, but if not, the threshold value is kept unchanged. By comparing the current value with the bottom-hold threshold value created as above, an ion current portion 602 superimposed on a monotonically-decreasing leak current is made detectable in an appropriate manner.

However, in a case as shown in FIG. 6C3, for example, in which the starting point of the bottom-hold threshold value comes behind the point where the ion current peaks, a problem arises in that an ion current portion 603 cannot be detected.

Moreover, since flowing of a leak current decreases the bias voltage as described above, in a combustion state under the same operating conditions, an ion current volume to be detected in the presence of the leak current becomes smaller than that detected in the absence thereof, in particular, under conditions such as a low rotation speed and a low load in which the ion current level becomes low, a bottom value in some cases cannot be determined due to a reduction in the peak level of the ion current.

SUMMARY OF THE INVENTION

The present invention has been made to aim at resolving problems as described above, which makes it possible to accurately discriminate between combustion and misfire regardless of the presence/absence of a leak current due to spark plug's smoldering and the like, so as to provide a combustion state detection device, for an internal combustion engine, that can help maintain the environment.

A combustion state detection device for an internal combustion engine according to the present invention is configured comprising: a spark plug that is disposed in a combustion chamber, and generates a spark for starting combustion of combustible air-fuel mixture in the chamber as well as serves as a probe for detecting ions produced attributed to the combustion; an ignition coil including a high voltage generation unit that has a primary winding and a secondary winding magnetically coupled with the primary winding, supplies to the spark plug, as a bias voltage for detecting the ions, an induction voltage generated in the secondary winding during activation of the primary winding and generates in the secondary winding a high voltage for generating the spark by interrupting the activation of the primary winding, and an ion current detection unit that outputs an ion signal detected by supplying the bias voltage to the spark plug; an ignition control unit that generates an activation signal for controlling the activation of the primary winding of the ignition coil; a comparison value setting unit that sets a comparison value with respect to the ion signal; and a combustion state discrimination unit that determines the occurrence of misfire when the ion signal is determined not to exceed the comparison value; wherein the ignition control unit, after generating the spark for starting the combustion of the combustible air-fuel mixture, controls the activation signal in such a way that the primary winding is reactivated at least one time during one combustion stroke so that an induction voltage similar to that generated in the secondary winding at around a time when the primary winding begins to be activated for the purpose of the combustion start is generated in the secondary winding, and the comparison value setting unit sets the comparison value based on the ion signal obtained at around a time when the activation signal begins to be supplied to the ignition coil for the purpose of starting the combustion of the combustible air-fuel mixture.

According to a combustion state detection device for an internal combustion engine of the present invention, even when a leak current flows due to spark plug's smoldering and the like, misfire in the internal combustion engine can be properly detected, so that pollutants can be prevented from being emitted into the air; therefore, a combustion state detection device for an internal combustion engine can be provided that can help maintain the environment.

The foregoing and other object, features, aspects and advantages of the present invention will become more apparent from the following detailed description of the present invention when taken in conjunction with the accompanying drawings.

DETAILED DESCRIPTION OF THE PREFERRED EMBODIMENTS

Hereinafter, an embodiment of the present invention will be explained referring to the accompanied drawings.

Embodiment 1

Figure 1:
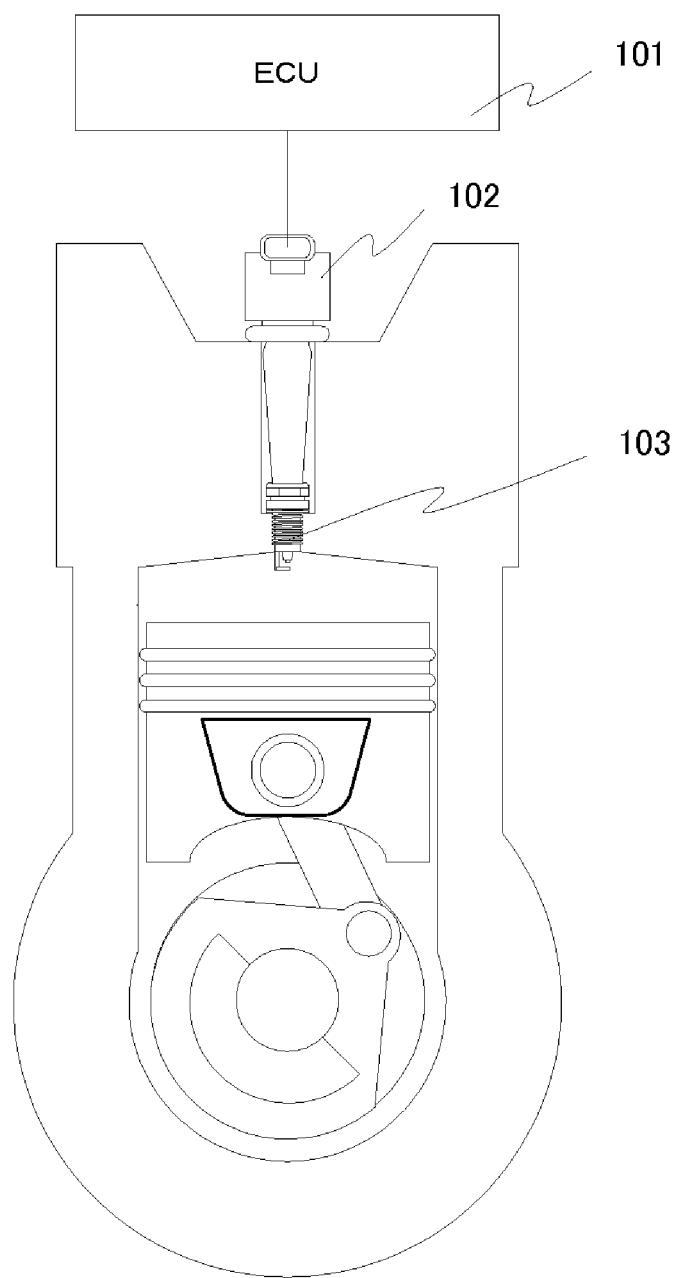
FIG. 1 is a schematic configurational view of a combustion state detection device for an internal combustion engine according to Embodiment 1 of the present invention.
Figure 2:
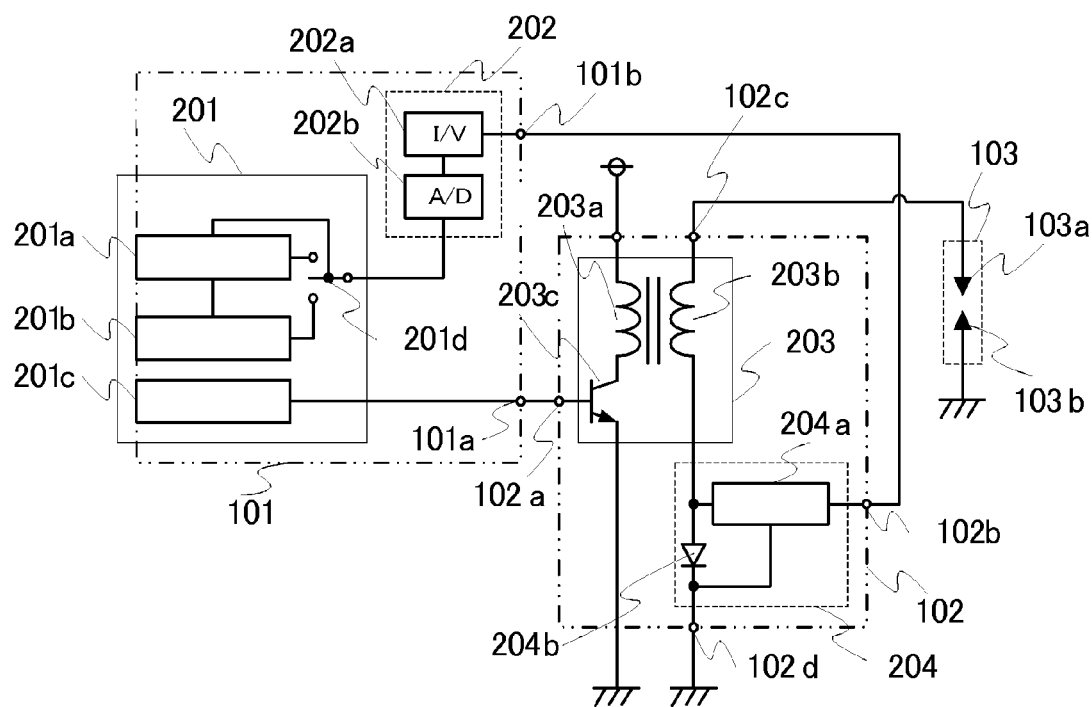
FIG. 2 is a detailed configurational view of the combustion state detection device for an internal combustion engine according to Embodiment 1 of the present invention.

FIG. 1 and FIG. 2 show a configuration of a combustion state detection device for an internal combustion engine according to Embodiment 1 of the present invention, which, as shown in FIG. 1, is made up of three components including an engine control unit 101 (hereinafter also referred to simply as ECU), an ignition coil 102 and a spark plug 103.

As shown in FIG. 2, the ECU 101 includes a micro computer 201 and a signal reception unit 202 that receives therein an ion current signal; furthermore, the micro computer 201 includes an ignition signal unit 201c that is an ignition control unit and generates an ignition signal for controlling the ignition coil 102, a threshold value setting unit 201a that is a comparison value setting unit and sets a threshold value with respect to the ion current signal for detecting misfire/combustion, and a combustion detection unit 201b that is a combustion state discrimination unit that discriminates between the presence and absence of combustion by comparing the ion current signal with the threshold value.

Moreover, the ignition coil 102, as described later, includes a high voltage generation unit 203 that generates a high voltage for generating a spark and an ion current detection unit 204 that detects and outputs an ion current, and the spark plug 103 serves as a probe for detecting the ion current as well as a spark plug for generating a spark to ignite combustible air-fuel mixture.

Next, the operation of the device during one combustion stroke of the engine will be explained referring to the configurational view of the device in FIG. 2 and the timing chart in FIG. 3.

Figure 3:
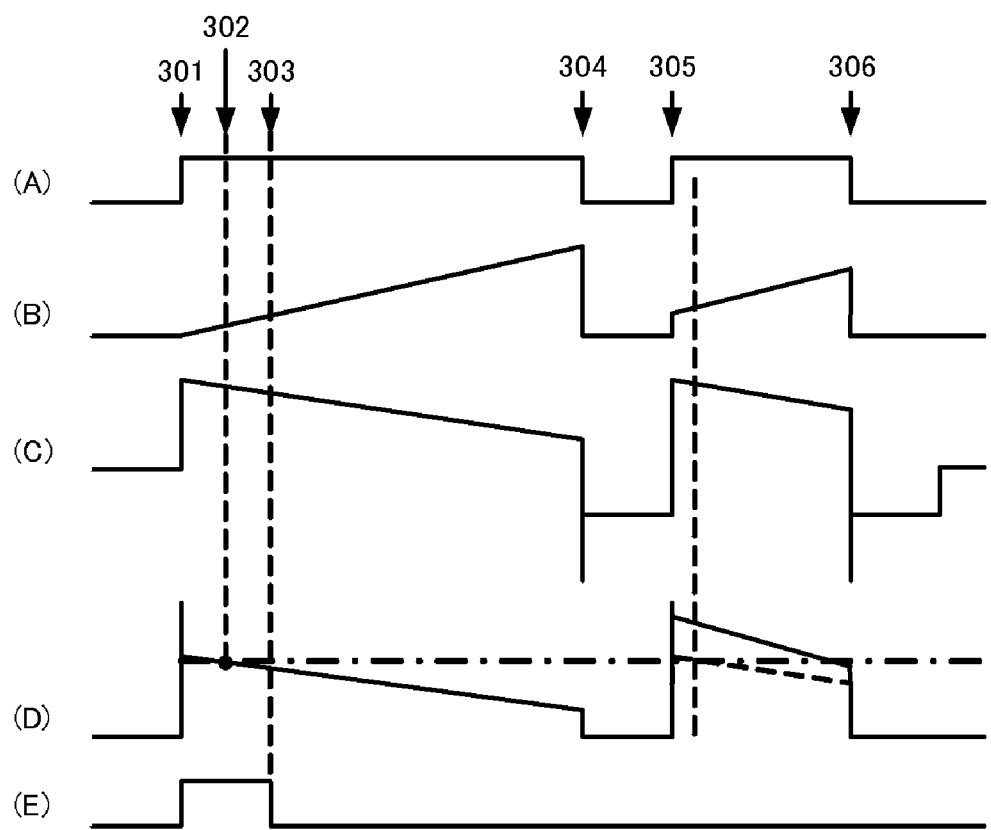
FIG. 3 is a timing chart for explaining the operation of Embodiment 1 of the present invention.

In FIG. 3, FIG. 3A shows an ignition signal; FIG. 3B, a primary current that flows in a primary winding 203a; FIG. 3C, a secondary voltage generated in a secondary winding 203b; FIG. 3D, a current signal that flows along an ion current path; and FIG. 3E, a switching signal that switches a switch 201d.

When the ignition signal comes into the HIGH state at time 301 in FIG. 3, a switching element 203c of the ignition coil 102 is driven into a conductive state, resulting in the primary current as shown in FIG. 3B beginning to flow in the primary winding 203a.

Since the primary winding 203a and the secondary winding 203b are magnetically coupled with each other, when the primary current begins to flow, a positive high voltage as shown in FIG. 3C is resultantly induced at the terminal 102c that is the high voltage side of the secondary winding 203b, which is applied to the center electrode 103a of the spark plug 103.

Now, since the high voltage is generated at around time 301 at the terminal 102c, if the isolation resistance between the center electrode 103a and the side electrode 103b of the spark plug 103 is decreased due to carbon adhesion, accumulation and the like therebetween, a leak current as shown by the solid line in FIG. 3D flows along the ion current path from ground via terminal 102d, a current mirror unit 204a, the secondary winding 203b, the terminal 102c, the center electrode 103a and the side electrode 103b in this order, and then flows back to ground.

A current equivalent to the leak current flowing at this moment is outputted by the current mirror 204a from the terminal 102b of the ignition coil 102 and then inputted via the terminal 101b of the ECU 101 into the signal reception unit 202. In the signal reception unit 202, after the current is converted by an I-V converter 202a into a signal in the form of voltage, the converted signal is digitized by an A-V converter 202b, and then the digitized signal is inputted into the micro computer 201.

Now, when the switching signal for the switch 201d is in the HIGH state as shown in FIG. 3E, the switch 201d is connected to the threshold value setting unit 201a, whereas when in the LOW state, the switch is connected to the combustion detection unit 201b. Therefore, the signal inputted into the micro computer 201 between time 301 and time 303 is then inputted into the threshold value setting unit 201a and used for threshold value setting operation.

Since noise arises immediately after time 301 when the ignition signal comes into the HIGH state, the threshold value setting unit 201a performs mask processing in which a signal is ignored over a time period between time 301 and time 302 after 300 μs have elapsed from time 301.

Then, with a time period between time 302 and time 303 after 500 μs have elapsed from time 302 being determined to be a threshold value setting period, the threshold value setting unit 201a performs processing to eliminate impulse noise from a signal during this threshold value setting period, that is, performs processing such as that using a low pass filter with a cut off frequency of approximately 4 kHz or a median filter with three data values, or that selecting out of two data values the smaller one, so as to obtain a maximum value (as shown by the dotted-dashed line in FIG. 3D). Based on the maximum value, an offset current value whose conversion value into a current flowing along the ion current path is equivalent to 4 μA is added to the maximum value, and the resultant value is set as a threshold value TH that is a comparison value for detecting combustion/misfire.

In the above, although the threshold value TH is set based on a maximum value of a signal during the threshold value setting period, a similar result may be obtained based on an average value, a median value or the like as well.

Moreover, when an A-D converter that converts an analog signal of 0 to 5 V into that in digital form is used as the A/D converter 202b, if a signal after passing the I-V converter 202a that converts a current signal into a voltage signal exceeds 4.5 V continuously for more than 300 μs or a signal exceeding 4.5 V continues more than 300 μs on an accumulation basis, the signal during the threshold value setting period is determined to be in an over-range state beyond the capabilities of the A-D converter 202b and the I-V converter 202a. Since a threshold value can not be properly determined in this state, subsequent processing of detecting combustion/misfire is suspended in such cases.

When the ignition signal is switched into the LOW state at time 304, the switching element 203c of the ignition coil 102 is turned into a non-conductive state so that as shown in FIG. 3B, the primary current is suddenly interrupted. At this moment a negative high voltage as shown in FIG. 3C is generated on the high voltage side of the secondary winding 203b.

When this negative high voltage is applied via the terminal 102c to the center electrode 103a of the spark plug 103, the insulation between the center electrode 103a and the side electrode 103b of the spark plug 103 is broken down, generating a spark, so that the combustible air-fuel mixture is ignited into combustion.

The ignition signal unit 201c subsequently switches the ignition signal into the HIGH state again at time 305 after 200 μs have elapsed from the ignition timing at time 304, during which the energy stored in the ignition coil is dissipated to a certain extent.

The primary current as shown in FIG. 3B begins to flow again in the primary winding 203a of the ignition coil 102, so that a high voltage similar to the positive high voltage generated at around time 301 is generated at around time 305. Here, the period between time 304 and time 305 is given as TD.

In this Embodiment 1, TD is intentionally selected in such a way that similar voltages are generated at around time 301 and around time 305.

According to experiments, if more than 30% of the energy stored in the ignition coil is dissipated, similar voltages are generated. Therefore, if the discharging characteristics of the ignition coil 102 in use, that is, its discharging duration, is approximately 1.2 ms when a Zener diode having a breakdown voltage of, for example, 800 V is connected to the high voltage terminal 102c of the ignition coil, a time until approximately 30% of the stored energy is dissipated can be calculated to be around 200 μs (the current flowing during the discharging period is assumed to be in the shape of a triangle in which its value becomes the highest at the time immediately after the discharging start and then monotonically decreases toward zero at the completion of the discharging).

Actually, although a voltage generated at a time when approximately 30% of the energy is dissipated becomes slightly lower than the voltage at time 301, a slightly shorter time has been selected, putting priority on opportunities and timings to detect ions produced on a flame sheet that disappears soon after the ignition (since the flame sheet spreads immediately after the ignition moving away from the spark plug, only ions in the proximity of the spark plug can be detected).

In order to make a voltage to be generated at time 305 approximate the voltage generated at time 301, it is effective to increase dissipation rate of energy as much as possible. TD may preferably be set to, for example, 1.2 ms or more, which is almost 100% of the discharging duration. However in this case, since there is a possibility that opportunities to detect ions produced on the combustion flame sheet might be lost, considerations, such as putting the above into practical use in an engine that has characteristics of easily producing ionized burned gas, need to be taken.

Moreover, actual discharging duration and energy dissipation rate fluctuate depending on operating conditions of an engine; therefore, setting TD as mapped values onto each of the operating conditions can also enhance accuracy of detecting combustion ions, although the number of matching steps tends to increase.

Figure 4:
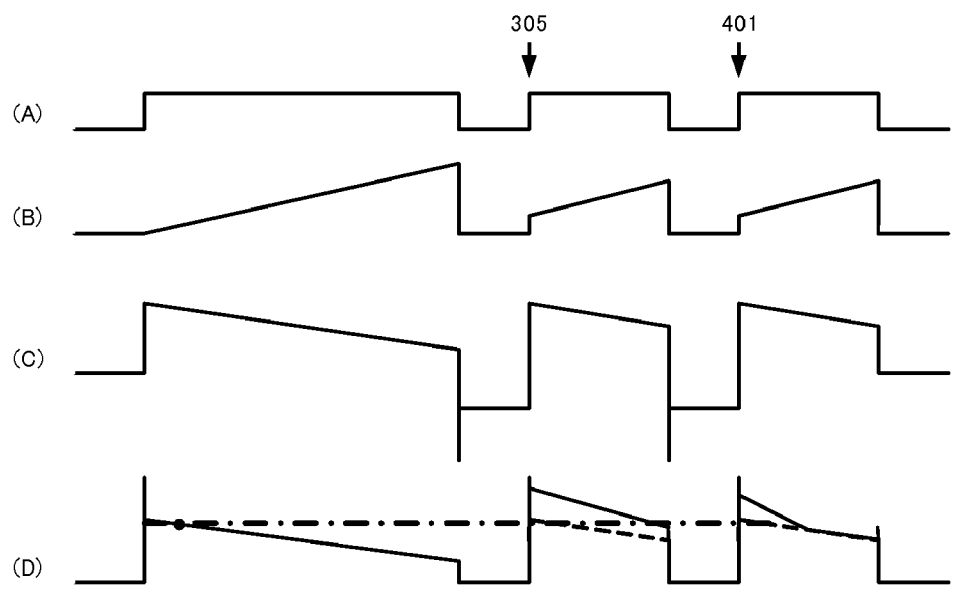
FIG. 4 is a timing chart showing another example of signals according to Embodiment 1 of the present invention.
Figure 5:
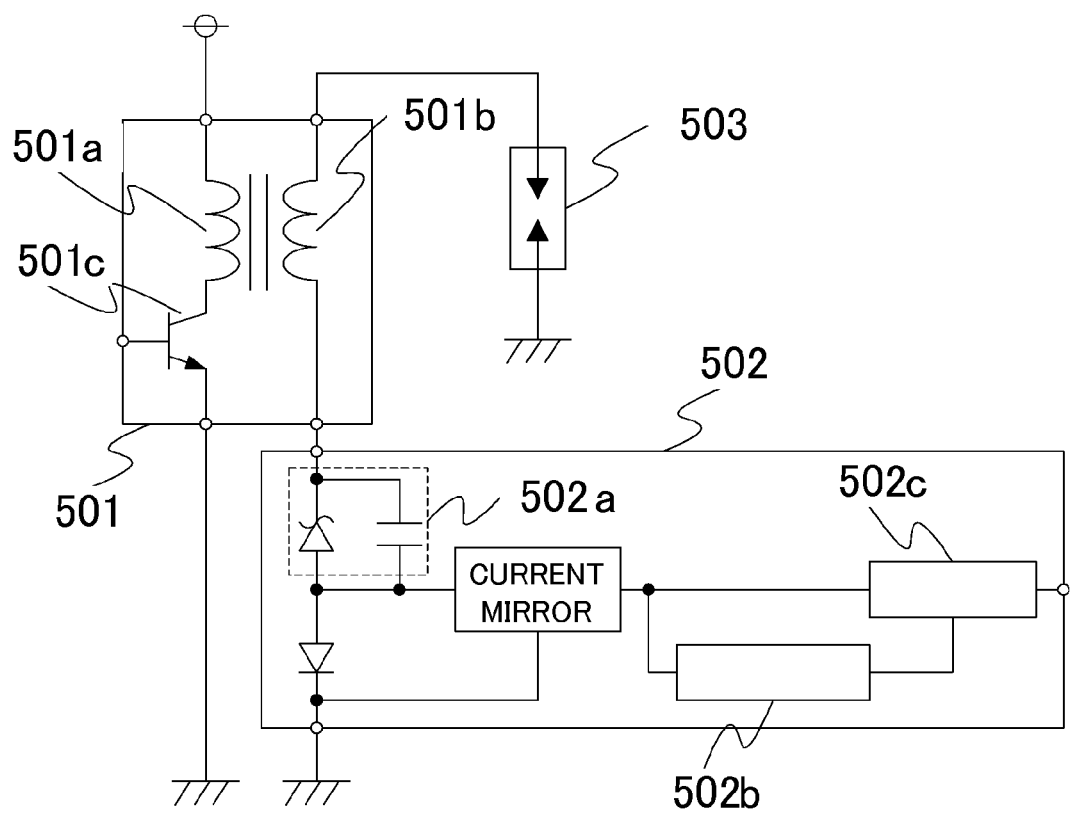
FIG. 5 is a configurational view exemplifying a conventional device.
Figure 6:
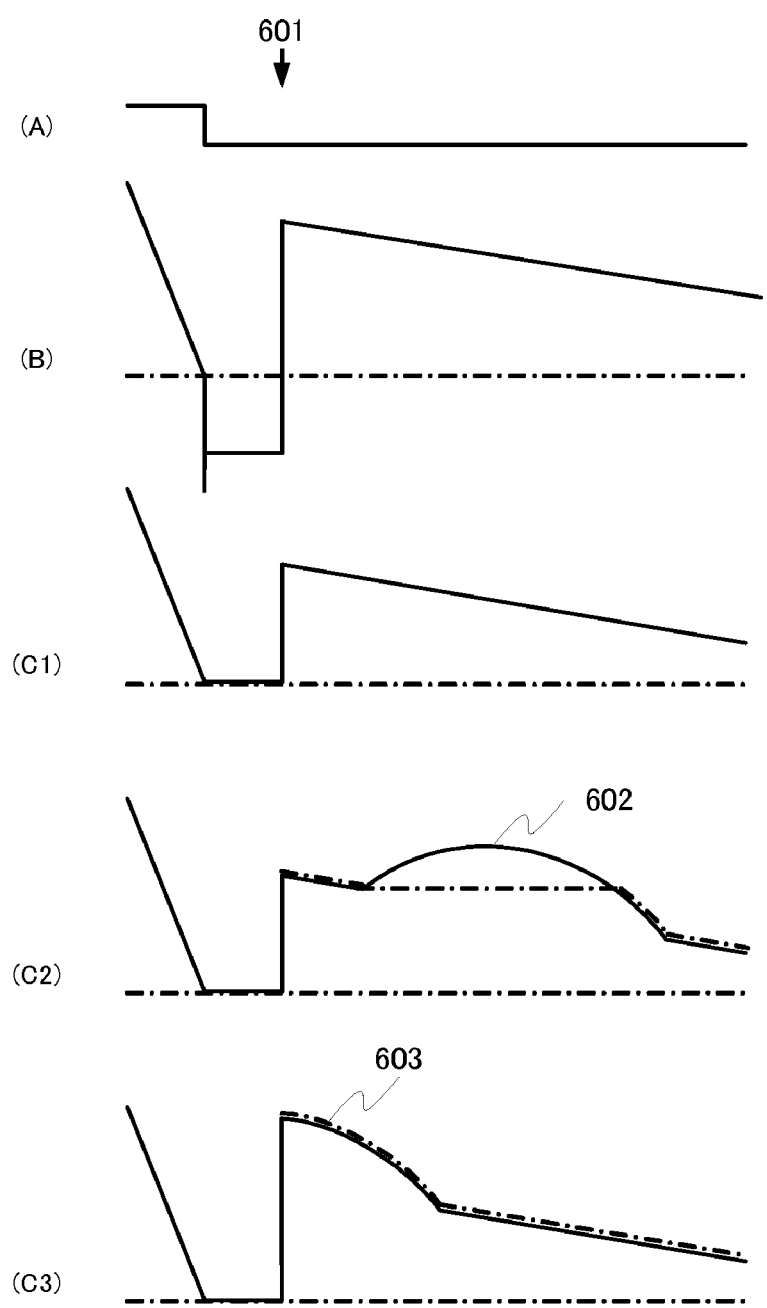
FIG. 6 is a timing chart in the conventional device.

Furthermore, in order to apply to the center electrode 103a of the spark plug 103 a voltage similar to that generated at time 301, an ignition signal is repeatedly applied a plurality of times during one combustion stroke, such as a first ignition signal is applied at time 305, a second one, at time 401 as shown in FIG. 4, so that the number of opportunities to detect combustion can be increased, thereby enhancing accuracy of detecting combustion. However, in Embodiment 1, a case will be explained for simplicity in which the number of times the ignition signal is repeatedly applied is just one time (as shown in FIG. 3).

Returning to FIG. 3, a positive high voltage similar to that generated at around time 301 is generated at around time 305. Therefore, if the isolation resistance between the center electrode 103a and the side electrode 103b of the spark plug 103 is decreased, a current signal between time 305 and time 306 becomes as shown by the solid line in FIG. 3D, which is the sum of an ion current and the leak current (shown by the dashed line in FIG. 3D and similar to the current signal obtained at around time 301).

This current signal is, as described above, outputted from the terminal 102b of the ignition coil 102, inputted into the reception unit via the terminal 101b of the ECU 101, and, after conversions of current into voltage by the I-V converter 202a and analog into digital by the A-D converter 202b, inputted into the micro computer 201.

As shown in FIG. 3E, since the switching signal for the switch 201d is in the LOW state after time 303 that gives the timing of ending the threshold value setting period, the current signal is inputted into the combustion detection unit 201b that serves as a combustion state discrimination unit.

Taking as a detection period the period of the ignition signal remaining in the HIGH state after time 305, that is, the period from time 305 to time 306 in the example shown in FIG. 3, the combustion detection unit 201b discriminates between combustion and misfire using a signal within this period.

Since noise arises immediately after time 305, the combustion detection unit 201b, as with the threshold value setting unit 201a, performs mask processing in which a signal is ignored over a period of 300 μs, and after this processing, performs the same processing of removing impulse noise from the inputted signal as described above.

Then, the combustion detection unit 201b compares the noise-removed signal with the threshold value TH set by the threshold value setting unit 201a; the unit 201b determines that combustion is taking place if the signal exceeding the threshold value successively continues more than 500 μs, and except for that the unit determines that misfire is occurring.

FIG. 3 shows an example of combustion. Since a similar voltage is applied at time 301 and time 305, a leak current to be obtained at around time 305 (shown by the dashed line in FIG. 3D) becomes similar to that obtained at around time 301. Therefore, the threshold value TH set at time 301 represents the level of the leak current; a current signal at around time 305 exceeding the threshold value TH would mean that an ion current is added to the leak current, so that a determination can be made that combustion is taking place in the example in FIG. 3.

The same result can also be obtained even by such a method as a determination is made that combustion is taking place if an accumulated time during which a signal exceeds the threshold value TH is longer than a predetermined time within the detection period.

Moreover, although the above explanation has been made using an example of a leak current flowing, by using this method, accurate discrimination between combustion and misfire can be made even under normal conditions as well (the conditions in which the insulation between the center electrode 103a and the side electrode 103b of the spark plug 103 is secured).

The ignition signal unit 201c, while curbing heat up of the ignition coil 102, switches the ignition signal into the LOW state at time 306 after a time equivalent to a crank angle of 10° has elapsed from time 305, which is necessary and sufficient for accurately detecting combustion/misfire, and then completes operations in one combustion stroke.

As described above, a combustion state detection device for an internal combustion engine according to Embodiment 1 of the present invention is configured comprising: a spark plug that is disposed in a combustion chamber, and generates a spark for starting combustion of combustible air-fuel mixture in the chamber as well as serves as a probe for detecting ions produced attributed to the combustion; an ignition coil including a high voltage generation unit that has a primary winding and a secondary winding magnetically coupled with the primary winding, supplies to the spark plug, as a bias voltage for detecting the ions, an induction voltage generated in the secondary winding during activation of the primary winding and generates in the secondary winding a high voltage for generating the spark by interrupting the activation of the primary winding, and an ion current detection unit that outputs an ion signal detected by supplying the bias voltage to the spark plug; an ignition control unit that generates an activation signal for controlling the activation of the primary winding of the ignition coil; a comparison value setting unit that sets a comparison value with respect to the ion signal; and a combustion state discrimination unit that determines the occurrence of misfire when the ion signal is determined not to exceed the comparison value; wherein the ignition control unit, after generating the spark for starting the combustion of the combustible air-fuel mixture, controls the activation signal in such a way that the primary winding is reactivated at least one time during one combustion stroke so that an induction voltage similar to that generated in the secondary winding at around a time when the primary winding begins to be activated for the purpose of the combustion start is generated in the secondary winding, and the comparison value setting unit sets the comparison value based on the ion signal obtained at around a time when the activation signal begins to be supplied to the ignition coil for the purpose of starting the combustion of the combustible air-fuel mixture. Therefore, even when there flows a leak current due to spark plug's smoldering and the like, combustion/misfire in an internal combustion engine can be properly detected, as a result, pollutants can be prevented from being emitted into the air, so that a combustion state detection device for an internal combustion engine can be provided that can help maintain the environment.

The comparison value setting unit sets as the comparison value a value in which a predetermined offset value is added to a maximum value (or an average value) of the ion signal obtained at around a time when the activation signal to the ignition coil begins to be supplied for the purpose of starting the combustion of the combustible air-fuel mixture, whereby even when there flows a leak current due to spark plug's smoldering and the like, misfire in an internal combustion engine can be properly detected.

Moreover, the combustion state discrimination unit suspends discrimination between combustion and misfire when the ion signal obtained at around a time when the activation signal to the ignition coil begins to be supplied for the purpose of starting the combustion of the combustible air-fuel mixture exceeds a signal range that the device can deal with, whereby the occurrence of erroneous detection of combustion/misfire can be prevented.

Furthermore, the ignition control unit, after the ignition coil has dissipated more than 30% of the energy stored in the coil, controls the activation signal so as to begin to reactivate the primary winding, whereby even when there flows a leak current due to spark plug's smoldering and the like, misfire in an internal combustion engine can be properly detected.

Moreover, the ignition control unit sets and controls timings to begin to reactivate the primary winding, being mapped onto each of operating conditions such as the number of rotations, a load and the temperature of cooling water, whereby even when there flows a leak current due to spark plug's smoldering and the like, misfire in an internal combustion engine can be properly detected.

Various modifications and alterations of this invention will be apparent to those skilled in the art without departing from the scope and spirit of this invention, and it should be understood that this is not limited to the illustrative embodiments set forth herein.

What is claimed is:

1. A combustion state detection device for an internal combustion engine, comprising:
    a spark plug, disposed in a combustion chamber, for generating a spark for starting combustion of combustible air-fuel mixture in the chamber as well as serving as a probe for detecting ions produced attributed to the combustion;
    an ignition coil including a high voltage generation unit that has a primary winding and a secondary winding magnetically coupled with the primary winding, supplies to the spark plug, as a bias voltage for detecting the ions, an induction voltage generated in the secondary winding during activation of the primary winding and generates in the secondary winding a high voltage for generating the spark by interrupting the activation of the primary winding, and an ion current detection unit that outputs an ion signal detected by supplying the bias voltage to the spark plug;
    an ignition control unit for generating an activation signal for controlling the activation of the primary winding of the ignition coil;
    a comparison value setting unit for setting a comparison value with respect to the ion signal; and
    a combustion state discrimination unit for determining an occurrence of misfire when the ion signal is determined not to exceed the comparison value; wherein
    the ignition control unit, after generating the spark for starting the combustion of the combustible air-fuel mixture, controls the activation signal in such a way that the primary winding is reactivated at least one time during one combustion stroke so that an induction voltage similar to that generated in the secondary winding at around a time when the primary winding begins to be activated for the purpose of the combustion start is generated in the secondary winding, and the comparison value setting unit sets the comparison value based on the ion signal obtained at around a time when the activation signal begins to be supplied to the ignition coil for the purpose of starting the combustion of the combustible air-fuel mixture.

2. A combustion state detection device for an internal combustion engine according to claim 1, wherein the comparison value setting unit sets as the comparison value a value in which a predetermine offset value is added to a maximum value of the ion signal obtained at around the time when the activation signal begins to be supplied to the ignition coil for the purpose of starting the combustion of the combustible air-fuel mixture.

3. A combustion state detection device for an internal combustion engine according to claim 1, wherein the comparison value setting unit sets as the comparison value a value in which a predetermine offset value is added to an average value of the ion signal obtained at around the time when the activation signal begins to be supplied to the ignition coil for the purpose of starting the combustion of the combustible air-fuel mixture.

4. A combustion state detection device for an internal combustion engine according to claim 1, wherein the combustion state discrimination unit suspends a determination of the occurrence of misfire when the ion signal obtained at around the time when the activation signal begins to be supplied to the ignition coil for the purpose of starting the combustion of the combustible air-fuel mixture is determined to exceed a signal range the unit can deal with.

5. A combustion state detection device for an internal combustion engine according to claim 1, wherein the ignition control unit, after the ignition coil has dissipated more than 30% of energy stored in the coil, controls the activation signal so as to begin to reactivate the primary winding.

6. A combustion state detection device for an internal combustion engine according to claim 1, wherein the ignition control unit sets timings to begin to reactivate the primary winding, being mapped onto each of operating conditions including the number of rotations, a load and the temperature of cooling water.

* * * * *